US009135632B2

(12) United States Patent
Vee et al.

(10) Patent No.: US 9,135,632 B2
(45) Date of Patent: Sep. 15, 2015

(54) METHODS AND SYSTEMS FOR AD PLACEMENT PLANNING

(75) Inventors: Erik Vee, San Mateo, CA (US); Dongni Chen, Sunnvale, CA (US); Peiji Chen, San Jose, CA (US); Satyen Kale, New York, NY (US); Srinath Mandalapu, Santa Clara, CA (US); Chandrashekhar Nagarajan, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 875 days.

(21) Appl. No.: 13/339,254

(22) Filed: Dec. 28, 2011

(65) Prior Publication Data

US 2013/0173384 A1 Jul. 4, 2013

(51) Int. Cl.
*G06Q 30/00* (2012.01)
*G06Q 30/02* (2012.01)
*G06Q 10/08* (2012.01)
*G06Q 20/20* (2012.01)

(52) U.S. Cl.
CPC .............. *G06Q 30/02* (2013.01); *G06Q 10/087* (2013.01); *G06Q 20/203* (2013.01); *G06Q 30/0244* (2013.01)

(58) Field of Classification Search
CPC .............. G06Q 10/087; G06Q 20/203; G06Q 30/0241–30/0277
USPC .............................. 705/28, 14.4–14.73, 14.43
See application file for complete search history.

(56) References Cited

U.S. PATENT DOCUMENTS

| | | | |
|---|---|---|---|
| 7,197,469 B2* | 3/2007 | Hegde et al. | 705/7.22 |
| 7,212,976 B2* | 5/2007 | Scheer | 705/7.34 |
| 7,546,249 B2* | 6/2009 | Main | 705/14.69 |
| 7,761,346 B2* | 7/2010 | Cooper et al. | 705/28 |
| 8,165,931 B2* | 4/2012 | Graefe et al. | 705/29 |
| 8,311,884 B2* | 11/2012 | Yang | 705/14.41 |
| 8,364,540 B2* | 1/2013 | Soroca et al. | 705/14.64 |
| 8,407,091 B2* | 3/2013 | Baluja | 705/14.43 |
| 8,412,572 B2* | 4/2013 | Cosman | 705/14.4 |
| 8,615,436 B2* | 12/2013 | Stukenborg et al. | 705/14.71 |
| 2006/0080171 A1* | 4/2006 | Jardins et al. | 705/14 |
| 2009/0157458 A1* | 6/2009 | Naganuma et al. | 705/7 |
| 2009/0222329 A1* | 9/2009 | Ramer et al. | 705/10 |
| 2009/0228128 A1* | 9/2009 | Milne et al. | 700/101 |
| 2009/0276317 A1* | 11/2009 | Dixon et al. | 705/14.61 |

(Continued)

OTHER PUBLICATIONS

Aggarwal, et al., A Framework for the Optimizing of WWW Advertising, Trends in Distributed Systems for Electronic Commerce, Lecture Notes in Computer Science, vol. 1402, 1998, pp. 1-10.*

*Primary Examiner* — Bennett Sigmond
(74) *Attorney, Agent, or Firm* — Mauriel Kapouytian Woods LLP; Andrew A. Noble; James Woods (57) ABSTRACT

Methods and systems are disclosed which allow shifting inventory to fulfill guaranteed delivery advertisement contracts. Inventory may be allocated from a supply of unallocated inventory to one or more advertisers in accordance with guaranteed delivery agreements. Inventory may be reserved for the one or more advertisers from the remaining supply of unallocated inventory. Inventory may then be allocated to an additional advertiser by using unallocated inventory or shifted inventory, or a combination of unallocated inventory and shifted inventory. The shifted inventory is shifted out of the allocation for the first advertiser and the shifted inventory is replaced by the reserve inventory for the respective advertiser.

20 Claims, 5 Drawing Sheets

(56) References Cited

U.S. PATENT DOCUMENTS

| | | | |
|---|---|---|---|
| 2010/0082425 A1* | 4/2010 | Yang | 705/14.46 |
| 2010/0106556 A1* | 4/2010 | Vee et al. | 705/10 |
| 2010/0185484 A1* | 7/2010 | Sordo et al. | 705/10 |
| 2010/0185515 A1* | 7/2010 | Yerneni et al. | 705/14.58 |
| 2010/0185516 A1* | 7/2010 | Swanson et al. | 705/14.58 |
| 2010/0293046 A1* | 11/2010 | Cooke et al. | 705/14.42 |
| 2011/0187717 A1* | 8/2011 | Jagannath et al. | 345/440 |
| 2011/0246312 A1* | 10/2011 | Meek et al. | 705/14.73 |
| 2011/0270674 A1* | 11/2011 | Cosman | 705/14.45 |
| 2011/0270676 A1* | 11/2011 | Vassilvitskii et al. | 705/14.49 |
| 2011/0282727 A1* | 11/2011 | Phan et al. | 705/14.36 |
| 2012/0173379 A1* | 7/2012 | Soroca et al. | 705/26.3 |
| 2013/0304581 A1* | 11/2013 | Soroca et al. | 705/14.64 |

* cited by examiner

METHODS AND SYSTEMS FOR AD PLACEMENT PLANNING

BACKGROUND

Online advertising marketplaces and exchanges may involve, for example, entities or parties including advertisers, publishers and data providers, as well as a marketplace or online advertising operations facilitator, or market-maker. Data providers may supply information, such as information regarding users, user behavior or user interests, which may enhance value to advertisers in connection with purchasing of advertising inventory. However, in marketplaces and exchanges, significant difficulty and transactional friction may exist in selectivity, arrangements and cooperation between parties. This can lead to suboptimal interactions, reducing efficiency and disincentivizing maximum engagement and spending. Furthermore, friction as well as inequities or unfairness may exist in connection with pricing arrangement, actual pricing, and allocation of spend between parties including advertisers and data providers, and such as in connection with sold advertising inventory.

There is a need for improved techniques in online advertising, including in online advertising marketplaces and exchanges, to increase transactional efficiency.

SUMMARY

Some embodiments of the invention provide systems and methods for inventory reservation to fulfill guaranteed delivery advertisement contracts. In accordance with some embodiments, a first inventory may be allocated from a supply of unallocated inventory to a first advertiser, wherein the first inventory satisfies the first advertiser's targeting criteria, and wherein the supply includes advertising opportunity inventory. For example, an advertiser may request 5000 impressions from a supply of 10,000 impressions. In some embodiments, the relationship between demand (e.g., contracts) and supply (e.g., impressions) may be modeled as a bipartite graph. A second inventory is then allocated from the remaining supply of unallocated inventory to a second advertiser, wherein the second inventory satisfies the second advertiser's targeting criteria.

A third inventory is reserved from the remaining supply of unallocated inventory to the first advertiser. The third inventory may be reserved for the first advertiser proportionally. In other words, the amount of the reserve inventory allocated to the first advertiser may be proportional to the amount of percentage of matching inventory that was allocated to the first advertiser. For example, out of a 10,000 impression supply, if 5000 was allocated to the first advertiser, and all of the remaining 5000 impressions meet the first advertiser's targeting criteria, then 2500 impressions (50% of 5000) will be reserved for the first advertiser. A fourth inventory is then reserved from the remaining supply of unallocated inventory to the second advertiser, wherein the fourth inventory satisfies the second advertiser's targeting criteria. As explained above, the fourth inventory may be reserved for the second advertiser proportionally.

A fifth inventory is allocated to a third advertiser, wherein the fifth inventory satisfies the third advertiser's targeting criteria and also satisfies the first advertiser's targeting criteria or the second advertiser's targeting criteria, by using unallocated inventory or shifted inventory, or a combination of unallocated inventory and shifted inventory. The shifted inventory is shifted out of the allocation for the first advertiser or the allocation for the second advertiser, and wherein the shifted inventory is replaced by the reserve inventory for the respective advertiser. Using the above example, assume that 5000 impressions from the supply of 10,000 impressions are allocated to the first advertiser, and 3000 impressions from the remaining 5000 impressions are allocated to the second advertiser. Now, if the third advertiser requests 2000 impressions, and the remaining 2000 impressions meet the third advertiser's criteria, then those 2000 impressions will be allocated to the third advertiser. However, if the 2000 impressions don't meet the third advertiser's criteria, then the third advertiser's demand may be filled with inventory which is shifted from the impressions allocated to the first and/or second advertisers. Thus, if part of the impressions which are allocated to the first and/or second advertisers meet the third advertiser's criteria, those impressions will be allocated to the third advertiser and the impressions which were shifted out from the first and/or second advertisers will be replaced by the impressions which were reserved for the first and/or second inventory.

DETAILED DESCRIPTION

Figure 1:
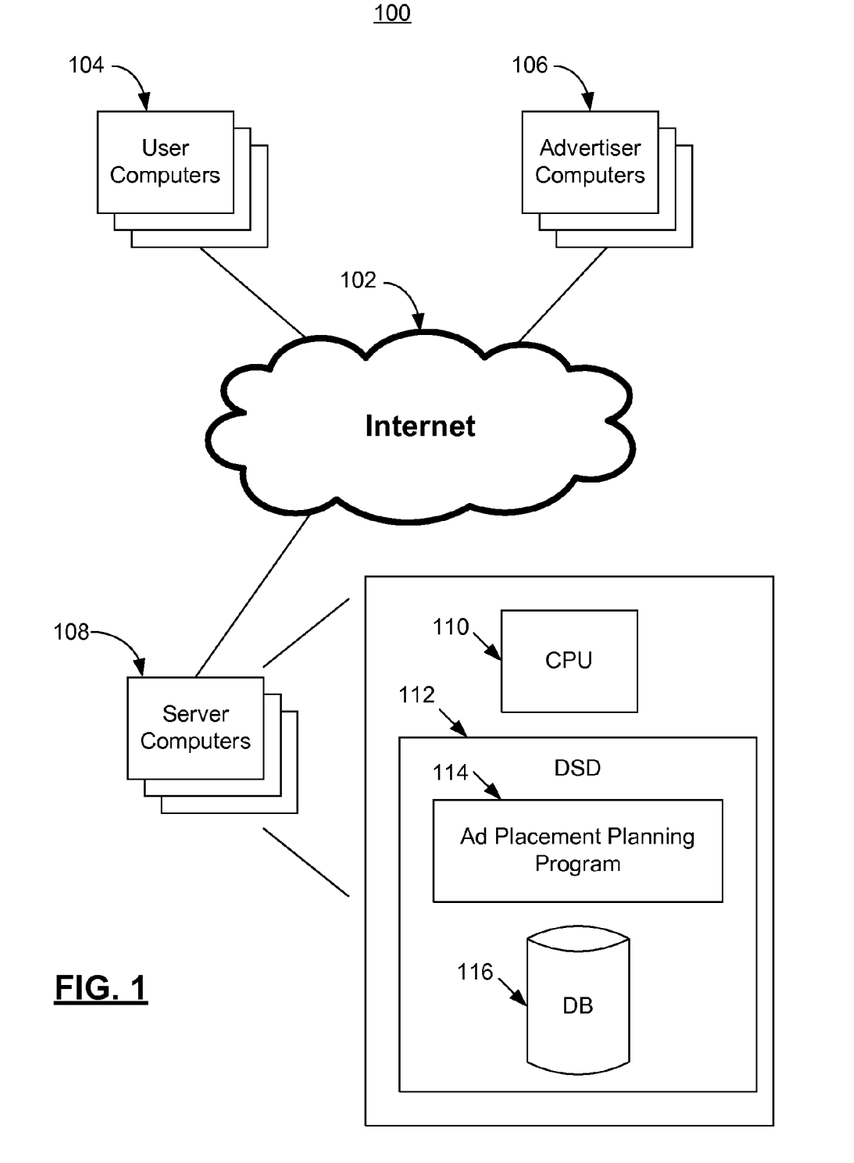
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or handheld devices such as cell phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and an Ad Placement Planning Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

As will be understood by one of ordinary skill in the art, in a guaranteed delivery advertising model, advertisers may enter into an agreement (e.g., a contract) with a publisher (e.g., a search engine, online newspaper, etc.) which guarantees or provides some measure of assurance that the advertiser will receive a certain agreed upon amount of suitable advertising. For example, the agreement may provide that the advertisement will have one million impressions (e.g., page views). By contrast, non-guaranteed delivery advertising models may be based on individual serving opportunities or may be spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics. The guaranteed delivery contracts may define targeting criteria such as, for example, user location, age, demographic, user profile information, search history, browse history, etc. For example, an advertiser may request that their advertisement be displayed when a page is visited by young females in CA.

However, the "supply" of impressions is substantially uncertain and may change over time. For example, unpredictable events such as natural disasters or acts of terrorism may result in large increases in traffic. Thus, since the supply is based on the impressions, the publisher can only attempt to estimate the future supply. In addition, the capacity is non-storable over time; as the supply is generated from the number of impressions, the publisher has to decide how to allocate the supply within a few seconds before it perishes. Selling the impressions to potential advertisers is further complicated by the issue of contention between different advertisers for the same impression. Advertisers may seek to reach a specific audience, e.g., females from California before sunset and when the stock market is up (e.g., Dow Jones Industrial Average has risen). Others may accept more loosely defined, less targeted impressions (e.g., females).

Figure 2:
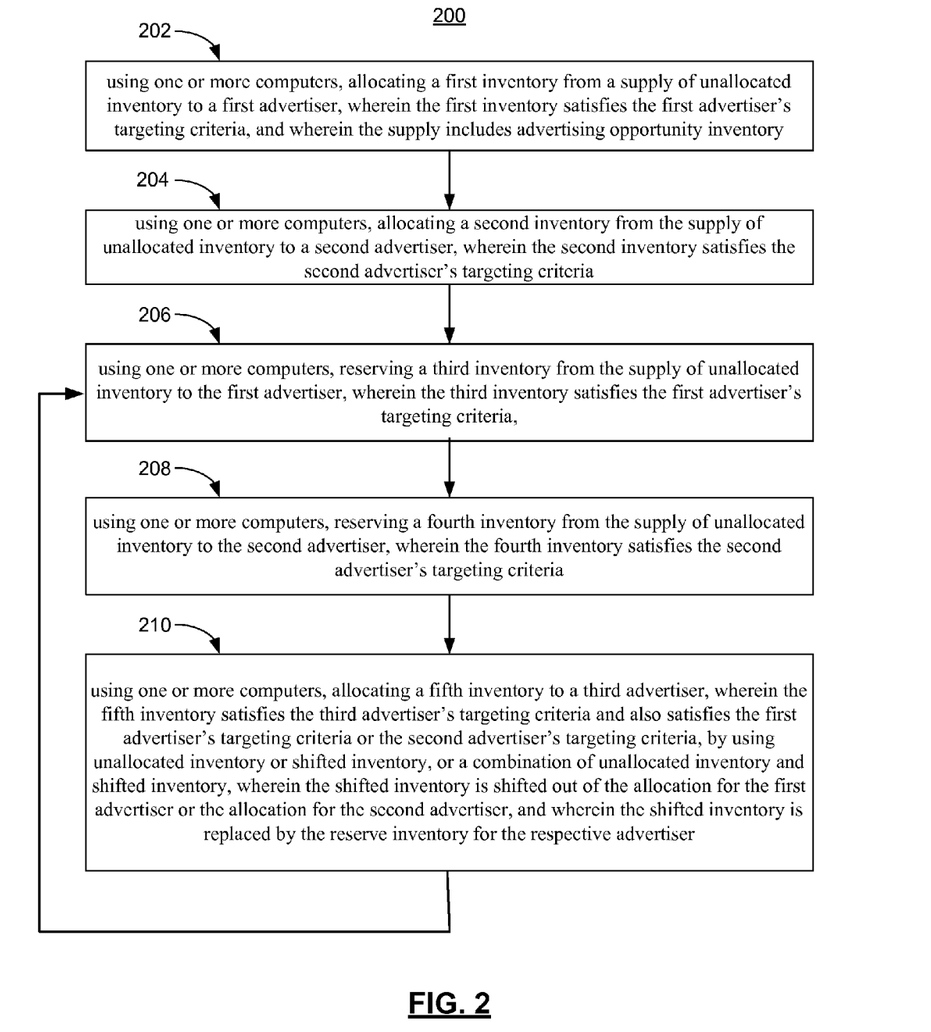
FIG. 2 is a flow diagram illustrating a method according to one embodiment of the invention.

Embodiments of the invention improve the efficiency of booking and allocating maximum demand and checking for availability for new guaranteed delivery contracts while managing contention between different contracts. FIG. 2 is a flow diagram illustrating a method 200 according to one embodiment of the invention. At step 202, using one or more computers, a first inventory from a supply of unallocated inventory is allocated to a first advertiser, wherein the first inventory satisfies the first advertiser's targeting criteria, and wherein the supply includes advertising opportunity inventory. For example, an advertiser may request 5000 impressions from a supply of 10,000 impressions. In some embodiments, the relationship between demand (e.g., contracts) and supply (e.g., impressions) may be modeled as a bipartite graph (explained in more detail in relation with FIG. 5).

At step 204, using one or more computers, a second inventory is allocated from the remaining supply of unallocated inventory to a second advertiser, wherein the second inventory satisfies the second advertiser's targeting criteria.

At step 206, using one or more computers, a third inventory is reserved from the remaining supply of unallocated inventory to the first advertiser, wherein the third inventory satisfies the first advertiser's targeting criteria. The third inventory may be reserved for the first advertiser proportionally. In other words, the amount of the reserve inventory allocated to the first advertiser may be proportional to the amount of inventory that was allocated to the first advertiser in step 202. For example, out of a 10,000 impression supply, if 5000 was allocated to the first advertiser, and all of the remaining 5000 impressions meet the first advertiser's targeting criteria, then 2500 impressions (50% of 5000) will be reserved for the first advertiser.

At step 208, using one or more computers, a fourth inventory is reserved from the remaining supply of unallocated inventory to the second advertiser, wherein the fourth inventory satisfies the second advertiser's targeting criteria. As explained above, the fourth inventory may be reserved for the second advertiser proportionally.

At step 210, using one or more computers, a fifth inventory is allocated to a third advertiser, wherein the fifth inventory satisfies the third advertiser's targeting criteria and also satisfies the first advertiser's targeting criteria or the second advertiser's targeting criteria, by using unallocated inventory or shifted inventory, or a combination of unallocated inventory and shifted inventory, wherein the shifted inventory is shifted out of the allocation for the first advertiser or the allocation for the second advertiser, and wherein the shifted inventory is replaced by the reserve inventory for the respective advertiser. Using the above example, assume that 5000 impressions from the supply of 10,000 impressions are allocated to the first advertiser, and 3000 impressions from the remaining 5000 impressions are allocated to the second advertiser. Now, if the third advertiser requests 2000 impressions, and the remaining 2000 impressions meet the third advertiser's criteria, then those 2000 impressions will be allocated to the third advertiser. However, if the 2000 impressions don't meet the third advertiser's criteria, then the third advertiser's demand may be filled with inventory which is shifted from the impressions allocated to the first and/or second advertisers. Thus, if part of the impressions which are allocated to the first and/or second advertisers meet the third advertiser's criteria, those impressions will be allocated to the third advertiser and the impressions which were shifted out from the first and/or second advertisers will be replaced by the impressions which were reserved for the first and/or second inventory. It should be noted that the above steps 206-210 may be repeated each time a new contract is to be filled (i.e., have inventory allocated to it).

Figure 3:
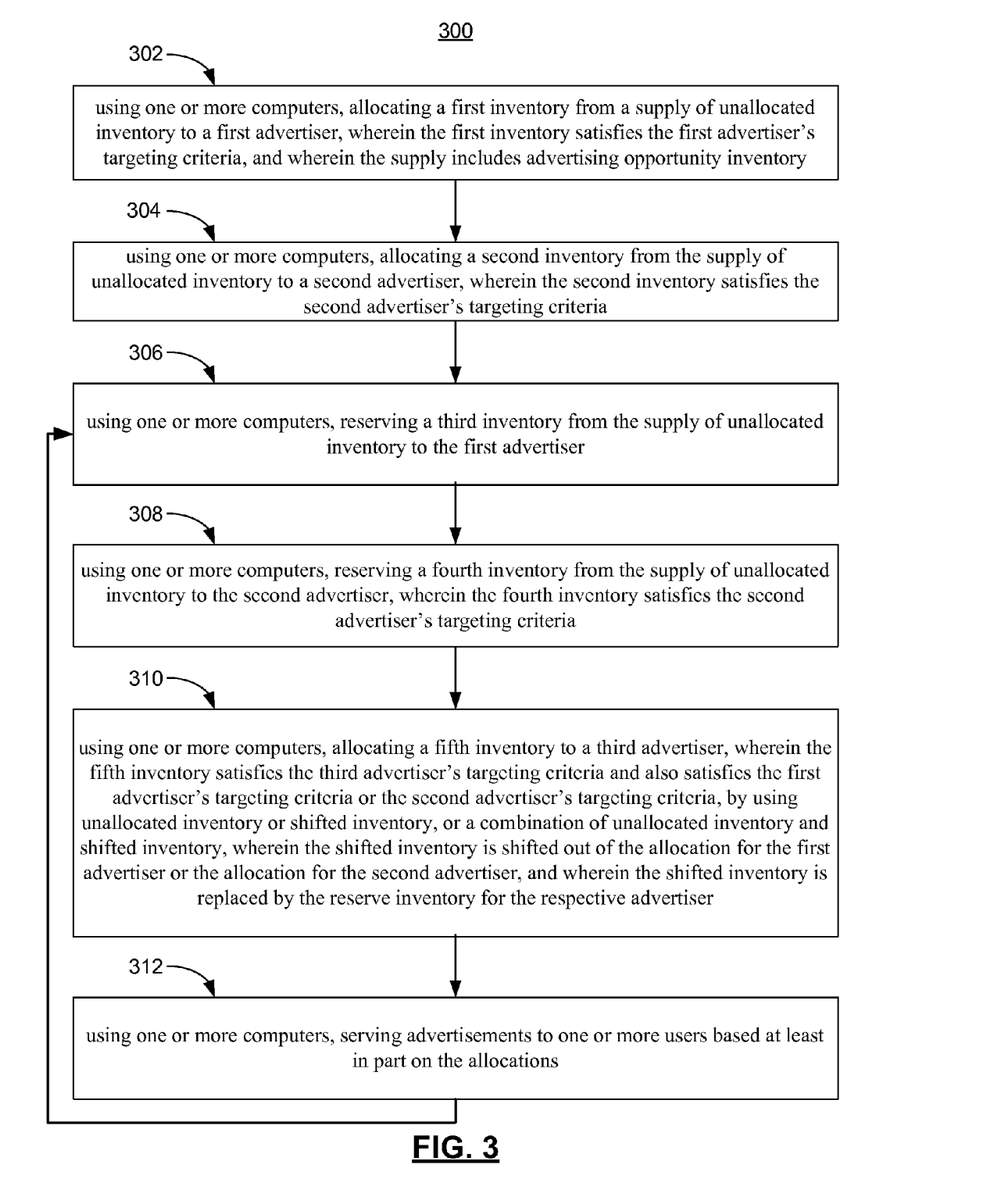
FIG. 3 is a flow diagram illustrating a method according to one embodiment of the invention.

FIG. 3 is a flow diagram illustrating a method 300 according to one embodiment of the invention. At step 302, using one or more computers, a first inventory from a supply of unallocated inventory is allocated to a first advertiser, wherein the first inventory satisfies the first advertiser's targeting criteria, and wherein the supply includes advertising opportunity inventory. For example, an advertiser may request 5000 impressions from a supply of 10,000 impressions. In some embodiments, the relationship between demand (e.g., contracts) and supply (e.g., impressions) may be modeled as a bipartite graph (explained in more detail in relation with FIG. 5).

At step 304, using one or more computers, a second inventory is allocated from the remaining supply of unallocated inventory to a second advertiser, wherein the second inventory satisfies the second advertiser's targeting criteria.

At step 306, using one or more computers, a third inventory is reserved from the remaining supply of unallocated inventory to the first advertiser, wherein the third inventory satisfies the first advertiser's targeting criteria.

At step 308, using one or more computers, a fourth inventory is reserved from the remaining supply of unallocated inventory to the second advertiser, wherein the fourth inventory satisfies the second advertiser's targeting criteria.

At step 310, using one or more computers, a fifth inventory is allocated to a third advertiser, wherein the fifth inventory satisfies the third advertiser's targeting criteria and also satisfies the first advertiser's targeting criteria or the second advertiser's targeting criteria, by using unallocated inventory or shifted inventory, or a combination of unallocated inventory and shifted inventory, wherein the shifted inventory is shifted out of the allocation for the first advertiser or the allocation for the second advertiser, and wherein the shifted inventory is replaced by the reserve inventory for the respective advertiser. At step 312, using one or more computers, one or more advertisements may be served to users (e.g., visitors to websites) based at least in part on the allocations. It should be noted that the above steps 306-310 may be repeated each time a new contract is to be filled (i.e., have inventory allocated to it).

Figure 4:
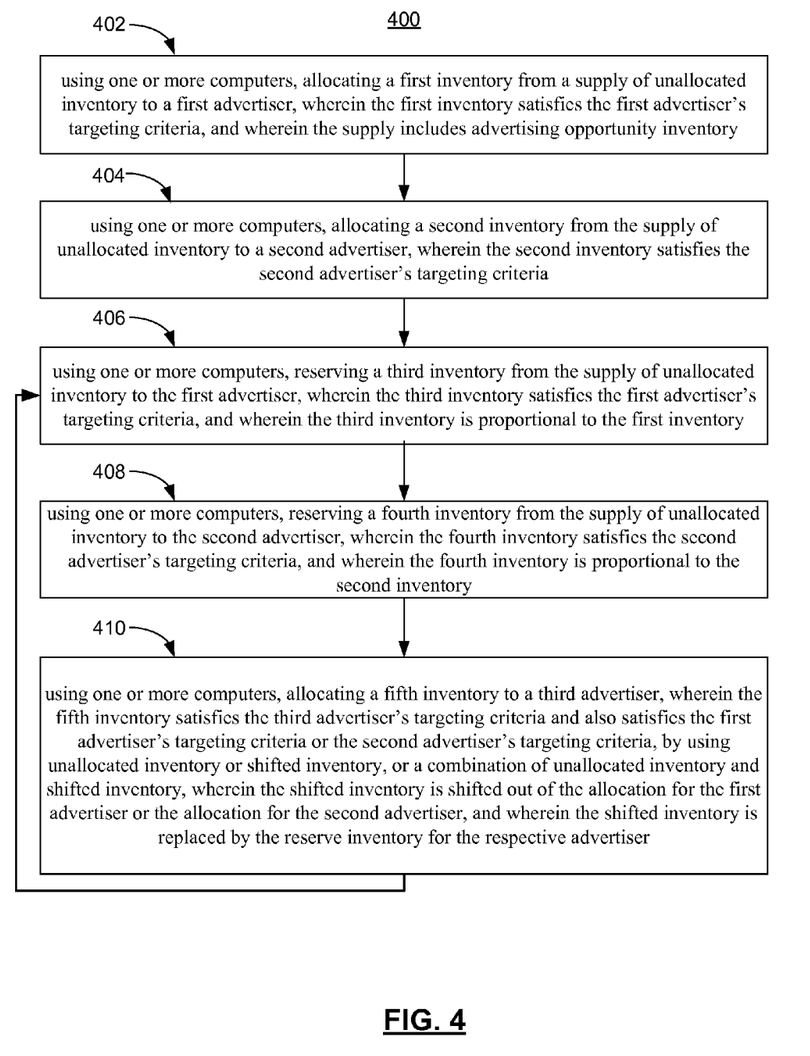
FIG. 4 is a flow diagram illustrating a method according to one embodiment of the invention.

FIG. 4 is a flow diagram illustrating a method 400 according to one embodiment of the invention. At step 402, using one or more computers, a first inventory from a supply of unallocated inventory is allocated to a first advertiser, wherein the first inventory satisfies the first advertiser's targeting criteria, and wherein the supply includes advertising opportunity inventory. For example, an advertiser may request 5000 impressions from a supply of 10,000 impressions. In some embodiments, the relationship between demand (e.g., contracts) and supply (e.g., impressions) may be modeled as a bipartite graph (explained in more detail in relation with FIG. 5).

At step 404, using one or more computers, a second inventory is allocated from the remaining supply of unallocated inventory to a second advertiser, wherein the second inventory satisfies the second advertiser's targeting criteria.

At step 406, using one or more computers, a third inventory is reserved from the remaining supply of unallocated inventory to the first advertiser, wherein the third inventory satisfies the first advertiser's targeting criteria. The third inventory is reserved for the first advertiser proportionally. As discussed above, the amount of the reserve inventory allocated to the first advertiser is proportional to the amount of inventory that was allocated to the first advertiser in step 402. For example, out of a 10,000 impression supply, if 5000 was allocated to the first advertiser, and all of the remaining 5000 impressions meet the first advertiser's targeting criteria, then 2500 impressions (50% of 5000) will be reserved for the first advertiser.

At step 408, using one or more computers, a fourth inventory is reserved from the remaining supply of unallocated inventory to the second advertiser, wherein the fourth inventory satisfies the second advertiser's targeting criteria. As explained above, the fourth inventory may be reserved for the second advertiser proportionally.

At step 410, using one or more computers, a fifth inventory is allocated to a third advertiser, wherein the fifth inventory satisfies the third advertiser's targeting criteria and also satisfies the first advertiser's targeting criteria or the second advertiser's targeting criteria, by using unallocated inventory or shifted inventory, or a combination of unallocated inventory and shifted inventory, wherein the shifted inventory is shifted out of the allocation for the first advertiser or the allocation for the second advertiser, and wherein the shifted inventory is replaced by the reserve inventory for the respective advertiser. It should be noted that the above steps 406-410 may be repeated each time a new contract is to be filled (i.e., have inventory allocated to it).

Figure 5:
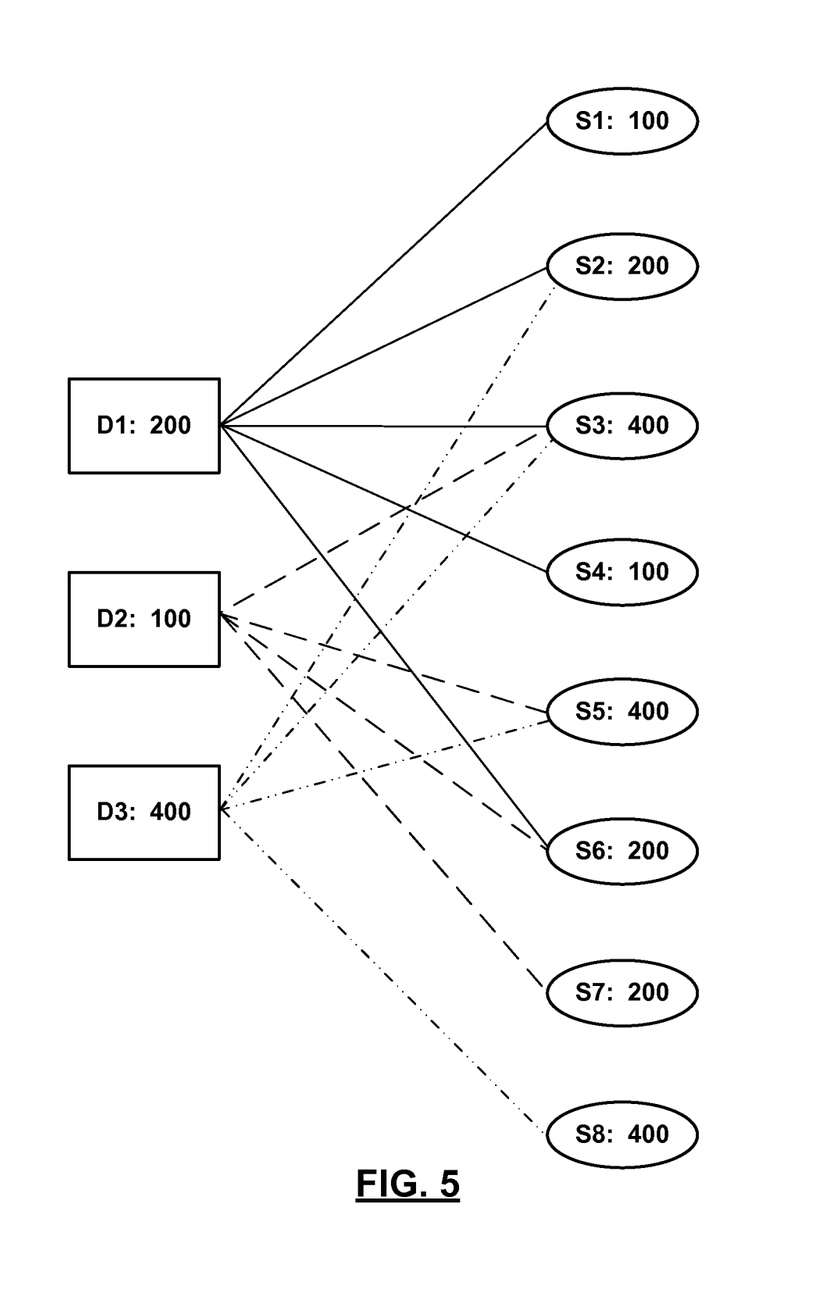
FIG. 5 is an exemplary bipartite graph according to one embodiment of the invention.

FIG. 5 illustrates an exemplary bipartite graph according to one embodiment of the invention. Bipartite graph 500 shows the eligibility edges between demand and supply nodes. In other words, bipartite graph 500 depicts how much of the available supply is eligible for each demand node (contract). The table below summarizes the demand and eligible supply for the demand and supply nodes shown in FIG. 5.

| Node | Demand | Eligible Supply |
|------|--------|-----------------|
| D1   | 200    | 1000            |
| D2   | 100    | 1200            |
| D3   | 400    | 1400            |

The bipartite graph may be mathematically represented as $G=(C, S, E)$ with C representing contracts (e.g., demand nodes) and S representing the supply nodes (e.g., different types of users visiting a website). A demand node j is connected (via edges E) to all supply nodes that are eligible for it. Each supply node i has an associated weight $s_i$ that is the forecast for the number of impressions of that type and each demand node j has an associated demand $d_j$ which is the number of requested impressions. A feasible allocation for the demands is a way of dividing up the supply among the contracts so that all demands are met. Formally, an allocation is represented by a fraction $x_{ij} \in [0, 1]$ for every edge $(i, j) \in E$, which specifies that $s_i x_{ij}$ amount of supply i is booked for demand node j. The requirement that the supply node is not overallocated corresponds to the condition that for all supply nodes i, $\Sigma_{j:j \sim i} x_{ij} \leq 1$, where j~i is notation for "j is connected to i" (and vice-versa). The requirement that all demands are met corresponds to the condition that for all demand nodes j, $\Sigma_{i:i \sim j} s_i x_{ij} = d_j$. Suppose an existing graph has an allocation meeting the current demands. We now want to add a new contract to the graph. The new demand node may be represented as j*, with its associated edges (i,j*) for the supply nodes i that are eligible for it.

Embodiments of the present invention allow for the possibility of shifting supply to allow more demand to be booked. The main impediment to shifting is that access is only available to a two neighborhood graph $G_{j*}$, and any shifted inventory must necessarily be moved outside the $G_{j*}$. Embodiments of the present invention rely on reserve inventories to allow shifting. In accordance with one embodiment, unallocated inventory within every supply node is divided up among the contracts (demand nodes) that are connected to it as reserved inventory. For example, suppose that impression i has two eligible contracts, 1 and 2, and that $x_{i1}=0.1$ and $x_{i2}=0.2$. Then supply node i has 70% of its inventory unallocated, and this 70% will be divided between contracts 1 and 2 proportionally. This process is repeated for every impression. In more detail, suppose we start with a graph $G=(C, S, E)$ with some initial allocation, $x_{ij}$ for every edge $(i, j) \in E$. Reserve inventories for every contract j in the graph are computed as follows. For every supply node i, the unallocated space among the contracts connected to it is divided up proportional to their allocated amounts. For example, contract j gets $$\frac{x_{ij}}{\sum_{j' \sim i} x_{ij'}} x_{ij},$$

fraction of the unallocated space in i reserved to it, which works out to a reserved supply of size:

$$Res_{ij} = s_i \frac{x_{ij}}{\sum_{j' \sim i} x_{ij'}} - s_i x_{ij} \qquad (1)$$

For every contract j, the total reserved inventory to it is:

$$R_j := \Sigma_{i:i \sim j} Res_{ij} \qquad (2)$$

As mentioned above, for a query node j*, a two neighborhood graph $G_{j*}$ (which shows a set of eligible impressions for j*, as well as all the contracts that match at least one of those eligible impressions) is determined. Impressions i~j* are referred to as being inside the query region (and other impressions as outside). The allocation $x_{ij}$ is computed for every impression i and contract j in $G_{j*}$. From this it is determined how much of the "inside" inventory is currently booked. In particular, there is $\Sigma_{i:i \sim j*} s_i$ eligible supply, but $\Sigma_j(\Sigma_{i:i \sim j} s_i x_{ij})$ of it is booked. However, for each contract j, there is $R_j$ reserved inventory available for shifting. That is, up to $R_j$ inventory currently allocated to j may be shifted from "inside" impressions to "outside" impressions. However, some of this reserved inventory actually comes from inside impressions, so it cannot be used for shifting. Thus, the amount of "inside" reserved inventory is calculated for j, and $R'_j$ is set to be the amount "outside." Thus, for each j, if $R'_j$ is greater than the amount currently allocated to inside impressions, then all of the allocation may be shifted outside the query region (recall that reserved inventory is partitioned, so that no two contracts share any reserved inventory). Otherwise, if $R'_j$ is less than the amount currently allocated inside, $R'_j$ may be shifted outside. Thus, the total amount booked, after shifting as much as possible, becomes:

$$\Sigma_j \max\{0, \Sigma_{i:i \sim j} s_i x_{ij} - R'_j\} \qquad (3)$$

Now suppose we are required to book some demand D for the contract j*. If D can be accommodated without changing any previous allocation, then D will be accommodated.

On the other hand, if contracts must be shifted to accommodate D, then the total amount that must be shifted to "outside" inventory is computed. This amount is then split among allocated contracts, proportional to the total amount that each contract is able to shift (this is $\min\{\Sigma_{i:i \sim j} s_i x_{ij}, R'_j\}$, where $R'_j$ is the reserved inventory "outside.").

Suppose contract j must shift $Sh_j$ inventory, and it has $X_j$ allocated inside. Then, the allocation $x_{ij}$ is uniformly changed for every inside impression to be $1 - S_{hj}/X_j$. Likewise, since $S_{hj}$ inventory was shifted outside, the value $R'_j$ must be decreased accordingly.

While the invention is described with reference to the above drawings, the drawings are intended to be illustrative, and the invention contemplates other embodiments within the spirit of the invention.

The invention claimed is:

1. A method comprising:
   using one or more computers, allocating a first inventory from a supply of unallocated inventory to a first advertiser, wherein the first inventory satisfies the first advertiser's targeting criteria, and wherein the supply includes advertising opportunity inventory;
   using one or more computers, allocating a second inventory from the supply of unallocated inventory to a second advertiser, wherein the second inventory satisfies the second advertiser's targeting criteria;
   using one or more computers, reserving a third inventory from the supply of unallocated inventory to the first advertiser, wherein the third inventory satisfies the first advertiser's targeting criteria;
   using one or more computers, reserving a fourth inventory from the supply of unallocated inventory to the second advertiser, wherein the fourth inventory satisfies the second advertiser's targeting criteria; and
   using one or more computers, allocating a fifth inventory to a third advertiser, wherein the fifth inventory satisfies the third advertiser's targeting criteria and also satisfies the first advertiser's targeting criteria or the second advertiser's targeting criteria, by shifting supply to accommodate the fifth inventory using a combination of unallocated inventory and shifted inventory, wherein the shifted inventory is shifted out of the allocation for the first advertiser or the allocation for the second advertiser, and wherein the shifted inventory is replaced by a reserve inventory partitioned for allocation to the first advertiser or the second advertiser respectively.

2. The method of claim 1 further comprising:
   using one or more computers, serving advertisements to one or more users based at least in part on the allocations.

3. The method of claim 1, further comprising:
   using one or more computers, modeling the supply of inventory as a bipartite graph.

4. The method of claim 1, wherein the supply includes impressions.

5. The method of claim 4, wherein the impressions are determined based on forecasts of future page views.

6. The method of claim 1, wherein the targeting criteria are based at least in part on a guaranteed delivery contract.

7. The method of claim 1, wherein each of the first, second and third advertisers are parties to respective guaranteed delivery contracts.

8. The method of claim 1, wherein reserving the third inventory comprises reserving inventory from the supply of unallocated inventory to the first advertiser in proportion to the allocation to the first advertiser from the supply of unallocated inventory.

9. The method of claim 1, wherein reserving the fourth inventory comprises reserving inventory from the supply of unallocated inventory to the second advertiser in proportion to the allocation to the second advertiser from the supply of unallocated inventory.

10. The method of claim 1, wherein the amount of inventory allocated to each advertiser is determined based at least in part on respective guaranteed delivery contracts.

11. A system comprising:
    one or more server computers coupled to a network; and
    one or more databases coupled to the one or more server computers;
    wherein the one or more server computers are for:
       allocating a first inventory from a supply of unallocated inventory to a first advertiser, wherein the first inventory satisfies the first advertiser's targeting criteria, and wherein the supply includes advertising opportunity inventory;
       allocating a second inventory from the supply of unallocated inventory to a second advertiser, wherein the second inventory satisfies the second advertiser's targeting criteria;
       reserving a third inventory from the supply of unallocated inventory to the first advertiser, wherein the third inventory satisfies the first advertiser's targeting criteria;

reserving a fourth inventory from the supply of unallocated inventory to the second advertiser, wherein the fourth inventory satisfies the second advertiser's targeting criteria; and allocating a fifth inventory to a third advertiser, wherein the fifth inventory satisfies the third advertiser's targeting criteria and also satisfies the first advertiser's targeting criteria or the second advertiser's targeting criteria, by shifting supply to accommodate the fifth inventory using a combination of unallocated inventory and shifted inventory, wherein the shifted inventory is shifted out of the allocation for the first advertiser or the allocation for the second advertiser, and wherein the shifted inventory is replaced by a reserve inventory partitioned for allocation to the first advertiser or the second advertiser respectively.

12. The system of claim 11, wherein the one or more server computers are for:

serving advertisements to one or more users based at least in part on the allocations.

13. The system of claim 11, wherein the supply includes impressions.

14. The system of claim 13, wherein the impressions are determined based on forecasts of future page views.

15. The system of claim 11, wherein the targeting criteria are based at least in part on a guaranteed delivery contract.

16. The system of claim 11, wherein each of the first, second and third advertisers are parties to respective guaranteed delivery contracts.

17. The system of claim 11, wherein reserving the third inventory comprises reserving inventory from the supply of unallocated inventory to the first advertiser in proportion to the allocation to the first advertiser from the supply of unallocated inventory.

18. The system of claim 11, wherein reserving the fourth inventory comprises reserving inventory from the supply of unallocated inventory to the second advertiser in proportion to the allocation to the second advertiser from the supply of unallocated inventory.

19. The system of claim 11, wherein the amount of inventory allocated to each advertiser is determined based at least in part on respective guaranteed delivery contracts.

20. A non-transitory computer readable medium or media containing instructions for executing a method comprising:

using one or more computers, allocating a first inventory from a supply of unallocated inventory to a first advertiser, wherein the first inventory satisfies the first advertiser's targeting criteria, and wherein the supply includes advertising opportunity inventory;

using one or more computers, allocating a second inventory from the supply of unallocated inventory to a second advertiser, wherein the second inventory satisfies the second advertiser's targeting criteria;

using one or more computers, reserving a third inventory from the supply of unallocated inventory to the first advertiser, wherein the third inventory satisfies the first advertiser's targeting criteria, and wherein the third inventory is proportional to the first inventory;

using one or more computers, reserving a fourth inventory from the supply of unallocated inventory to the second advertiser, wherein the fourth inventory satisfies the second advertiser's targeting criteria, and wherein the fourth inventory is proportional to the second inventory; and using one or more computers, allocating a fifth inventory to a third advertiser, wherein the fifth inventory satisfies the third advertiser's targeting criteria and also satisfies the first advertiser's targeting criteria or the second advertiser's targeting criteria, by shifting supply to accommodate the fifth inventory using a combination of unallocated inventory and shifted inventory, wherein the shifted inventory is shifted out of the allocation for the first advertiser or the allocation for the second advertiser, and wherein the shifted inventory is replaced by a reserve inventory partitioned for allocation to the first advertiser or the second advertiser respectively.

* * * * *